US010381867B1

(12) United States Patent
Le et al.

(10) Patent No.: US 10,381,867 B1
(45) Date of Patent: Aug. 13, 2019

(54) FERRORESONANT TRANSFORMER SYSTEMS AND METHODS WITH SELECTABLE INPUT AND OUTPUT VOLTAGES FOR USE IN UNINTERRUPTIBLE POWER SUPPLIES

(71) Applicant: Alpha Technologies Inc., Bellingham, WA (US)

(72) Inventors: Thanh Quoc Le, Ferndale, WA (US); Pankaj H. Bhatt, Bellingham, WA (US); Thomas Patrick Newberry, Blaine, WA (US)

(73) Assignee: ALPHA TECHNOLOGEIS SERVICES, INC., Bellingham, WA (US)

( * ) Notice: Subject to any disclaimer, the term of this patent is extended or adjusted under 35 U.S.C. 154(b) by 0 days.

(21) Appl. No.: 15/294,571

(22) Filed: Oct. 14, 2016

Related U.S. Application Data (60) Provisional application No. 62/242,862, filed on Oct. 16, 2015.

(51) Int. Cl.
  H02J 9/00 (2006.01)
  H02J 9/06 (2006.01)
  H02M 7/44 (2006.01)

(52) U.S. Cl.
  CPC .............. *H02J 9/061* (2013.01); *H02M 7/44* (2013.01)

(58) Field of Classification Search
  CPC ................................. H02J 9/00; H02M 7/00
  USPC ........................................................ 307/23
  See application file for complete search history.

(56) References Cited

U.S. PATENT DOCUMENTS

| 352,105 A | 11/1886 | Zipernowsky et al. |
| 375,614 A | 12/1887 | Eickemeyer |
| 414,266 A | 11/1889 | Thomson |
| 1,718,238 A | 6/1929 | Kettering et al. |
| 1,950,396 A | 3/1934 | Boucher |
| 2,007,415 A | 7/1935 | Walker |
| 2,014,101 A | 9/1935 | Bryan |

(Continued)

FOREIGN PATENT DOCUMENTS

| AU | 687528 B | 12/1995 |
| AU | 2029495 A | 12/1995 |

(Continued)

OTHER PUBLICATIONS

Smart Powershop/Smart Energy Systems International AG, "Off-Grid SMA Power Set XS," Sep. 29, 2010, 5 pages.

(Continued)

*Primary Examiner* — Rexford N Barnie
*Assistant Examiner* — Joseph N Inge
(74) *Attorney, Agent, or Firm* — Michael R. Schacht; Schacht Law Office, Inc.

(57) ABSTRACT

A ferroresonant transformer system has a core, a shunt, first and second input windings, an inverter winding, a tank winding, a resonant capacitor, an output capacitor, and a plurality of switches. The tank winding defines a plurality of switch tap locations and at least two output tap locations. The resonant capacitor is connected across at least a portion of the tank winding. Each switch is operatively connectable between one of the switch tap locations and the resonant capacitor. Each output terminal is operatively connected to one of the at least two output tap locations.

10 Claims, 4 Drawing Sheets

(56) References Cited

U.S. PATENT DOCUMENTS

| | | | |
|---|---|---|---|
| 2,037,183 A | 4/1936 | Strieby | |
| 2,037,188 A | 4/1936 | Russell | |
| 2,036,994 A | 12/1936 | Frank et al. | |
| 2,063,994 A | 12/1936 | Frank et al. | |
| 2,085,072 A | 6/1937 | Bobe | |
| 2,165,969 A | 7/1939 | Humbert et al. | |
| 2,240,123 A | 4/1941 | Shoup et al. | |
| 2,302,192 A | 11/1942 | Dannheiser | |
| 2,352,073 A | 6/1944 | Boucher et al. | |
| 2,427,678 A | 9/1947 | Laging | |
| 2,444,794 A | 7/1948 | Uttal et al. | |
| 2,512,976 A | 6/1950 | Smeltzly | |
| 2,688,704 A | 9/1954 | Christenson | |
| 2,856,543 A | 10/1958 | Dixon et al. | |
| 2,920,211 A | 1/1960 | Gotoh | |
| 2,996,656 A | 8/1961 | Sola | |
| 3,022,458 A | 2/1962 | Sola | |
| 3,064,195 A | 11/1962 | Freen | |
| 3,221,172 A | 11/1965 | Rolison | |
| 3,283,165 A | 11/1966 | Bloch | |
| 3,293,445 A | 12/1966 | Levy | |
| 3,304,599 A | 2/1967 | Nordin | |
| 3,305,762 A | 2/1967 | Geib, Jr. | |
| 3,339,080 A | 8/1967 | Howald | |
| 3,345,517 A | 10/1967 | Smith | |
| 3,348,060 A | 10/1967 | Jamieson | |
| 3,389,329 A | 6/1968 | Quirk et al. | |
| 3,435,358 A | 3/1969 | Rheinfelder | |
| 3,458,710 A | 7/1969 | Dodge | |
| 3,521,152 A | 7/1970 | Emerson | |
| 3,525,035 A | 8/1970 | Kakalec | |
| 3,525,078 A | 8/1970 | Baggott | |
| 3,546,571 A | 12/1970 | Fletcher et al. | |
| 3,590,362 A | 6/1971 | Kakalec | |
| 3,636,368 A | 1/1972 | Sia | |
| 3,678,284 A | 7/1972 | Peters | |
| 3,678,377 A | 7/1972 | Chiffert | |
| 3,686,561 A | 8/1972 | Spreadbury | |
| 3,691,393 A | 9/1972 | Papachristou | |
| 3,737,858 A | 6/1973 | Turner et al. | |
| 3,742,251 A | 6/1973 | Thompson et al. | |
| 3,823,358 A | 7/1974 | Rey | |
| 2,860,748 A | 1/1975 | Everhart et al. | |
| 3,859,589 A | 1/1975 | Rush | |
| 3,860,748 A | 1/1975 | Everhart et al. | |
| 3,873,846 A | 3/1975 | Morio et al. | |
| 3,909,560 A | 9/1975 | Martin et al. | |
| 3,916,295 A * | 10/1975 | Hunter | G05F 1/38 |
| | | | 323/248 |
| 3,938,033 A | 2/1976 | Borkovitz et al. | |
| 3,943,447 A | 3/1976 | Shomo, III | |
| 4,004,110 A | 1/1977 | Whyte | |
| 4,010,381 A | 3/1977 | Fickenscher et al. | |
| 4,060,844 A | 11/1977 | Davis et al. | |
| 4,122,382 A | 10/1978 | Bernstein | |
| 4,130,790 A | 12/1978 | Heisey | |
| 4,170,761 A | 10/1979 | Koppehele | |
| 4,198,624 A | 4/1980 | Watanabe | |
| 4,217,533 A | 8/1980 | Van Beek | |
| 4,251,736 A | 2/1981 | Coleman | |
| 4,262,245 A | 4/1981 | Wendt | |
| 4,270,080 A | 5/1981 | Kostecki | |
| 4,277,692 A | 7/1981 | Small | |
| 4,295,053 A | 10/1981 | Kovatch et al. | |
| 4,295,054 A | 10/1981 | Kovatch et al. | |
| 4,313,060 A | 1/1982 | Fickenscher et al. | |
| 4,353,014 A | 10/1982 | Willis | |
| 4,366,389 A | 12/1982 | Hussey | |
| 4,366,390 A | 12/1982 | Rathmann | |
| 4,385,263 A | 5/1983 | Luz | |
| 4,400,624 A | 8/1983 | Ebert, Jr. | |
| 4,400,625 A | 8/1983 | Hussey | |
| 4,423,379 A | 12/1983 | Jacobs et al. | |
| 4,446,458 A | 5/1984 | Cook | |
| 4,460,834 A | 7/1984 | Gottfried | |
| 4,466,041 A | 8/1984 | Witulski et al. | |
| 4,472,641 A | 9/1984 | Dickey et al. | |
| 4,475,047 A | 10/1984 | Ebert | |
| 4,477,799 A | 10/1984 | Rocci et al. | |
| 4,510,401 A | 4/1985 | Legoult | |
| 4,604,530 A | 8/1986 | Shibuya | |
| 4,616,305 A | 10/1986 | Damiano et al. | |
| 4,628,426 A | 12/1986 | Steigerwald | |
| 4,631,471 A | 12/1986 | Fouad et al. | |
| 4,656,412 A | 4/1987 | McLyman | |
| 4,670,702 A | 6/1987 | Yamada et al. | |
| 4,673,825 A | 6/1987 | Raddi et al. | |
| 4,686,375 A | 8/1987 | Gottfried | |
| 4,697,134 A | 9/1987 | Burkum et al. | |
| 4,700,122 A | 10/1987 | Cimino et al. | |
| 4,709,318 A | 11/1987 | Gephart et al. | |
| 4,719,427 A | 1/1988 | Morishita et al. | |
| 4,719,550 A | 1/1988 | Powell et al. | |
| 4,775,800 A | 1/1988 | Wood | |
| 4,724,290 A | 2/1988 | Campbell | |
| 4,724,478 A | 2/1988 | Masuko et al. | |
| 4,730,242 A | 3/1988 | Divan | |
| 4,733,223 A | 3/1988 | Gilbert | |
| 4,740,739 A | 4/1988 | Quammen et al. | |
| 4,745,299 A | 5/1988 | Eng et al. | |
| 4,748,341 A | 5/1988 | Gupta | |
| 4,748,342 A | 5/1988 | Dijkmans | |
| 4,763,014 A | 8/1988 | Model et al. | |
| 4,791,542 A | 12/1988 | Piaskowski | |
| 4,829,225 A | 5/1989 | Podrazhansky et al. | |
| 4,860,185 A | 8/1989 | Brewer et al. | |
| 4,864,483 A | 9/1989 | Divan | |
| 4,882,717 A | 11/1989 | Hayakawa et al. | |
| 4,885,474 A | 12/1989 | Johnstone et al. | |
| 4,890,213 A | 12/1989 | Seki | |
| 4,916,329 A | 4/1990 | Dang et al. | |
| 4,920,475 A | 4/1990 | Rippel | |
| 4,922,125 A | 5/1990 | Casanova et al. | |
| 4,926,084 A | 5/1990 | Furutsu et al. | |
| 4,943,763 A | 7/1990 | Bobry | |
| 4,952,834 A | 8/1990 | Okada | |
| 4,954,741 A | 9/1990 | Furutsu et al. | |
| 4,975,649 A | 12/1990 | Bobry | |
| 4,988,283 A | 1/1991 | Nagasawa et al. | |
| 5,010,469 A | 4/1991 | Bobry | |
| 5,017,800 A | 5/1991 | Divan | |
| 5,027,264 A | 6/1991 | DeDoncker et al. | |
| 5,029,285 A | 7/1991 | Bobry | |
| 5,057,698 A | 10/1991 | Widener et al. | |
| 5,099,410 A | 3/1992 | Divan | |
| 5,137,020 A | 8/1992 | Wayne et al. | |
| 5,148,043 A | 9/1992 | Hirata et al. | |
| 5,154,986 A | 10/1992 | Takechi et al. | |
| 5,168,205 A | 12/1992 | Kan et al. | |
| 5,172,009 A | 12/1992 | Mohan | |
| 5,185,536 A | 2/1993 | Johnson, Jr. et al. | |
| 5,193,067 A | 3/1993 | Sato et al. | |
| 5,198,698 A | 3/1993 | Paul et al. | |
| 5,198,970 A | 3/1993 | Kawabata et al. | |
| 5,200,586 A | 4/1993 | Smith et al. | |
| 5,200,643 A | 4/1993 | Brown | |
| 5,220,597 A | 6/1993 | Horiuchi | |
| 5,224,025 A | 6/1993 | Divan et al. | |
| 5,229,650 A | 7/1993 | Kita et al. | |
| 5,237,208 A | 8/1993 | Tominaga et al. | |
| 5,241,591 A | 8/1993 | Saji | |
| 5,281,919 A | 1/1994 | Palanisamy | |
| 5,302,858 A | 4/1994 | Folts | |
| 5,334,057 A | 8/1994 | Blackwell | |
| 5,400,005 A | 3/1995 | Bobry | |
| 5,402,053 A | 3/1995 | Divan et al. | |
| 5,410,720 A | 4/1995 | Osterman | |
| 5,440,179 A | 8/1995 | Severinsky | |
| 5,457,377 A | 10/1995 | Jonsson | |
| 5,467,384 A | 11/1995 | Skinner, Sr. | |
| 5,483,463 A | 1/1996 | Qin et al. | |
| 5,532,525 A | 7/1996 | Kaiser et al. | |
| 5,579,197 A | 11/1996 | Mengelt et al. | |
| 5,581,246 A | 12/1996 | Yarberry et al. | |

(56) References Cited

U.S. PATENT DOCUMENTS

| | | |
|---|---|---|
| 5,602,462 A | 2/1997 | Stich et al. |
| 5,610,451 A | 3/1997 | Symonds |
| 5,635,773 A | 6/1997 | Stuart |
| 5,638,244 A | 6/1997 | Mekanik et al. |
| 5,642,002 A | 6/1997 | Mekanik et al. |
| 5,664,002 A | 9/1997 | Skinner, Sr. |
| 5,734,831 A | 3/1998 | Sanders |
| 5,739,595 A | 4/1998 | Mekanik et al. |
| 5,745,356 A | 4/1998 | Tassitino, Jr. et al. |
| 5,747,887 A | 5/1998 | Takanaga et al. |
| 5,747,888 A | 5/1998 | Zilberberg |
| 5,760,495 A | 6/1998 | Mekanik |
| 5,768,117 A | 6/1998 | Takahashi et al. |
| 5,783,932 A | 7/1998 | Namba et al. |
| 5,790,391 A | 8/1998 | Stich et al. |
| 5,804,890 A | 9/1998 | Kakalec et al. |
| 5,844,327 A | 12/1998 | Batson |
| 5,845,190 A | 12/1998 | Bushue et al. |
| 5,880,536 A | 3/1999 | Mardirossian |
| 5,892,431 A | 4/1999 | Osterman |
| 5,897,766 A | 4/1999 | Kawatsu |
| 5,901,057 A | 5/1999 | Brand et al. |
| 5,925,476 A | 7/1999 | Kawatsu |
| 5,961,604 A | 10/1999 | Anderson et al. |
| 5,982,412 A | 11/1999 | Nulty |
| 5,982,645 A | 11/1999 | Levran et al. |
| 5,982,652 A | 11/1999 | Simonelli et al. |
| 5,994,793 A | 11/1999 | Bobry |
| 5,994,794 A | 11/1999 | Wehrlen |
| 6,011,324 A | 1/2000 | Kohlstruck et al. |
| 6,014,015 A | 1/2000 | Thorne et al. |
| 6,028,414 A | 2/2000 | Chouinard et al. |
| 6,069,412 A | 5/2000 | Raddi et al. |
| 6,074,246 A | 6/2000 | Seefeldt et al. |
| 6,100,665 A | 8/2000 | Alderman |
| 6,198,178 B1 | 3/2001 | Schienbein et al. |
| 6,212,081 B1 | 4/2001 | Sakai |
| 6,218,744 B1 | 4/2001 | Zahrte et al. |
| 6,288,456 B1 | 9/2001 | Crafty |
| 6,288,916 B1 | 9/2001 | Liu et al. |
| 6,295,215 B1 | 9/2001 | Faria et al. |
| 6,344,985 B1 | 2/2002 | Akerson |
| 6,348,782 B1 | 2/2002 | Oughton et al. |
| 6,426,610 B1 | 7/2002 | Janik |
| 6,433,905 B1 | 8/2002 | Price et al. |
| 6,456,036 B1 | 9/2002 | Thandiwe |
| 6,465,910 B2 | 10/2002 | Young et al. |
| 6,486,399 B1 | 11/2002 | Armstrong et al. |
| 6,602,627 B2 | 8/2003 | Liu et al. |
| 6,738,435 B1 | 5/2004 | Becker |
| 6,768,722 B1 | 7/2004 | Katseff et al. |
| 6,841,971 B1 | 1/2005 | Spée et al. |
| 6,906,933 B2 | 6/2005 | Taimela |
| 6,933,626 B2 | 8/2005 | Oughton |
| 7,040,920 B2 | 5/2006 | Johnson et al. |
| 7,043,049 B2 | 5/2006 | Kuzma |
| 7,102,251 B2 | 9/2006 | West |
| 7,182,632 B1 | 2/2007 | Johnson et al. |
| 7,449,798 B2 | 11/2008 | Suzuki et al. |
| 7,543,328 B2 | 6/2009 | Bialk et al. |
| 7,567,520 B2 | 7/2009 | Ostrosky |
| 7,835,379 B2 | 11/2010 | Dravida et al. |
| 8,074,888 B2 | 12/2011 | Naccache |
| 8,344,685 B2 | 1/2013 | Bertness et al. |
| 8,575,779 B2 | 11/2013 | Le et al. |
| 8,616,457 B2 | 12/2013 | Krawczewicz et al. |
| 9,030,045 B2 | 5/2015 | Richardson et al. |
| 9,030,048 B2 | 5/2015 | Heidenreich et al. |
| 9,234,916 B2 | 1/2016 | Peck et al. |
| 9,312,726 B2 | 4/2016 | Heidenreich et al. |
| 9,633,781 B2 * | 4/2017 | Le ................ H01F 27/40 |
| 9,812,900 B2 | 11/2017 | Richardson et al. |
| 9,881,625 B2 | 1/2018 | Liu et al. |
| 2001/0033502 A1 | 10/2001 | Blair et al. |
| 2003/0046706 A1 | 3/2003 | Rakib |
| 2003/0048006 A1 | 3/2003 | Shelter et al. |
| 2004/0031059 A1 | 2/2004 | Bialk et al. |
| 2004/0207366 A1 | 10/2004 | Sung |
| 2005/0096772 A1 | 5/2005 | Cox et al. |
| 2005/0258927 A1 | 11/2005 | Lu |
| 2006/0168612 A1 | 7/2006 | Chapman et al. |
| 2007/0002875 A1 | 1/2007 | Rocci et al. |
| 2007/0262650 A1 | 11/2007 | Li |
| 2008/0024268 A1 | 1/2008 | Wong et al. |
| 2008/0203820 A1 | 8/2008 | Kramer et al. |
| 2008/0278006 A1 | 11/2008 | Gottlieb et al. |
| 2009/0076661 A1 | 3/2009 | Pearson et al. |
| 2009/0196082 A1 | 8/2009 | Mazumder et al. |
| 2009/0240377 A1 | 9/2009 | Batzler et al. |
| 2010/0008397 A1 | 1/2010 | Johnson |
| 2010/0045107 A1 | 2/2010 | Cohen et al. |
| 2010/0161259 A1 | 6/2010 | Kim et al. |
| 2010/0191387 A1 | 7/2010 | Warren et al. |
| 2010/0250192 A1 | 9/2010 | Deokar et al. |
| 2010/0324548 A1 | 12/2010 | Godara et al. |
| 2010/0328851 A1 | 12/2010 | Jurek |
| 2011/0187197 A1 | 8/2011 | Moth |
| 2011/0238345 A1 | 9/2011 | Gauthier et al. |
| 2011/0273151 A1 | 11/2011 | Lesso et al. |
| 2012/0051734 A1 | 3/2012 | Weiss et al. |
| 2012/0091811 A1 | 4/2012 | Heidenreich et al. |
| 2012/0127800 A1 | 8/2012 | Heidenreich et al. |
| 2012/0212051 A1 | 8/2012 | Heidenreich et al. |
| 2012/0217800 A1 | 8/2012 | Heidenreich et al. |
| 2012/0217806 A1 | 8/2012 | Heidenreich et al. |
| 2012/0217808 A1 | 8/2012 | Richardson et al. |
| 2013/0113287 A1 | 5/2013 | Singh et al. |
| 2013/0162650 A1 | 6/2013 | Marivoet et al. |
| 2013/0312020 A1 | 11/2013 | Talbert |
| 2014/0062189 A1 | 3/2014 | Le et al. |
| 2014/0254392 A1 | 9/2014 | Wolcott et al. |
| 2015/0241892 A1 | 8/2015 | Gaucher et al. |
| 2015/0244211 A1 | 8/2015 | Richardson et al. |
| 2017/0229906 A1 | 8/2017 | Le et al. |
| 2018/0062427 A1 | 3/2018 | Richardson et al. |
| 2019/0018437 A1 | 1/2019 | Le |

FOREIGN PATENT DOCUMENTS

| | | |
|---|---|---|
| AU | 2015203667 B2 | 3/2017 |
| CA | 1265231 A | 1/1990 |
| CA | 2033685 A1 | 10/1991 |
| CA | 2036296 A1 | 11/1991 |
| CA | 1297546 C | 3/1992 |
| CA | 2086897 A1 | 7/1993 |
| CA | 2149845 A1 | 12/1995 |
| CA | 2168520 A1 | 8/1996 |
| CA | 2028269 A1 | 1/2000 |
| CA | 2403888 A1 | 9/2001 |
| CA | 2713017 A1 | 7/2009 |
| CA | 2504101 A1 | 5/2010 |
| CA | 2760581 A1 | 11/2010 |
| CN | 101330686 B | 3/2012 |
| DE | 2602789 A1 | 7/1977 |
| DE | 2809514 A1 | 9/1978 |
| DE | 3321649 A1 | 12/1983 |
| EP | 0196004 B1 | 11/1993 |
| EP | 0284541 A2 | 9/1998 |
| EP | 2425515 A2 | 3/2012 |
| EP | 2587620 A2 | 5/2013 |
| EP | 2858015 A1 | 4/2015 |
| FR | 762789 A | 4/1934 |
| FR | 861215 A | 2/1941 |
| GB | 188405201 A | 3/1884 |
| GB | 005201 | 4/1885 |
| GB | 260731 A | 9/1925 |
| GB | 2005118 A | 4/1979 |
| GB | 2120474 A | 11/1983 |
| GB | 2137033 A | 3/1984 |
| GB | 2171861 A | 9/1986 |
| GB | 2185326 A | 10/1986 |
| GB | 2355350 A | 4/2001 |
| GB | 2475612 A | 5/2011 |
| JP | S5482053 A | 6/1979 |

(56) References Cited

FOREIGN PATENT DOCUMENTS

| | | | |
|---|---|---|---|
| JP | S5532133 A | 3/1980 | |
| JP | S5650417 A | 5/1981 | |
| JP | S56155420 A | 12/1981 | |
| JP | 2000350381 A | 12/2000 | |
| JP | 2001190035 A | 7/2001 | |
| JP | 2005295776 A | 10/2005 | |
| JP | 2010136547 A | 6/2010 | |
| JP | 2010252573 A | 11/2010 | |
| KR | 20070108759 A | 11/2007 | |
| RU | 2191459 C1 | 10/2002 | |
| RU | 2221320 C2 | 10/2004 | |
| RU | 2304335 C2 | 8/2007 | |
| TW | 200941897 A | 10/2009 | |
| TW | I539721 B | 6/2016 | |
| WO | 8501842 A1 | 4/1985 | |
| WO | 002118 A1 | 4/2000 | |
| WO | 2009094540 A2 | 7/2009 | |
| WO | 2010135406 A1 | 11/2010 | |
| WO | 2011103131 A3 | 12/2011 | |
| WO | 2012099911 A1 | 7/2012 | |
| WO | 2012144127 A1 | 10/2012 | |
| WO | 2012148512 A1 | 11/2012 | |
| WO | 2012112252 A3 | 1/2013 | |
| WO | 2013106356 A1 | 7/2013 | |
| WO | 2017044970 A1 | 3/2017 | |
| WO | 2019014682 A1 | 1/2019 | |
| WO | 2019051321 A1 | 3/2019 | |
| WO | 2019051499 A2 | 3/2019 | |

OTHER PUBLICATIONS

Spears, "Disturbances Can Toast Your System," Reprint from Communications Technology, Apr. 2000, 4 pages.
Stewart Nowak, Power Problems: Selecting a UPS, Electronics Test, Jul. 13, 1990, 4 pages, No. 7, San Francisco, CA, US.
USPTO, "Final Office Action, U.S. Appl. No. 14/516,522,", dated Jan. 8, 2019, 22 pages.
Wallace et al., Wireless Load Sharing of Single Phase Telecom Inverters, Telecommunication Energy Conference, 1999, 13 pages.
Xia, Ordinary Meter Measures Battery Resistance, EDN-Design Ideas, Jun. 24, 1993, 2 pages.
Yamada, Research and Development of Telecommunications Energy Systems in NTT, NTT Integrated Infromation and Energy Systems Laboratories, Mar. 9, 2011, 8 pages.
Alpha Technologies, Inc., Cheetah CMD-N GS7000 Transponder, 2015, offer for sale 2009, 2 pages.
Alpha Technologies, Inc., Cheetah CMD-N Harmonic Transponder, 2015, offer for sale 2007, 2 pages.
Alpha Technologies, Inc., Cheetah XD Network Tracker Plus, 2015, offer for sale Nov. 2011, 2 pages.
Alpha Technologies, Inc., Power Technical Bulletin DSM3 vs DSM1 Provisioning, Dec. 2010, 4 pages.
Batson et al., Solving the Powering Requirements of Broadband Dial Tone Service, 1994, 3 pages.
Bridge et al., "Preventing outages without batteries," CED, Jun. 1999, 7 pages.
Broadband Business and News Perspective, "Cable operators feeling power surge," Reprinted from CED, Apr. 2000, 4 pages.
Cheetah Technologies, L.P., Cheetah CMD-N. Arris SG4000, 2014, offer for sale Feb. 3, 2011, 2 pages.
Cheetah Technologies, L.P., Cheetah CMD-P+ DOCSIS-based Transponder for Cable Power Systems, 2014, offer for sale 2008, 3 pages.
Cheetah Technologies, L.P., CMD-P+ Transponder User Manual, Mar. 18, 2011, 88 pages.
Contino et al., Water-Cooling Applications for Telecommunications and Computer Energy Systems, Telecommunications Energy Conference, IEEE, 1988, pp. 441-447.
Electroline Equipment Inc., DOCSIS 2.0 and EuroDOCSIS Status Monitoring Transponder for Power Supplies, 2006, 2 pages.
Eto et al., Research, Development, and Demonstration Needs for Large-Scale, Reliability-Enhancing, Integration of Distributed Energy Resources, IEEE Proceedings of the 33rd Hawaii International Conference on System Sciences, 2000, 7 pages.
European Patent Office, "Extended European Search Report", Application No. 16845289.4, Dec. 19, 2018, 10 pages.
H.C. Gerdes et al., A Practical Approach to Understanding Ferroresonance, EEE-Circuit Design Engineering, pp. 37-89, Apr. 1966.
Hart et al., The Derivation and Application of Design Equations for Ferroresonant Voltage Regulators and Regulated Rectifiers, IEEE Transactions on Magnetics, vol. MAG-7, No. 1, Mar. 1971, pp. 205-211.
Hitron Technologies Inc., DNP-30341 DOCSIS-Based Downstream Monitor, Sep. 2012, 2 pages.
IEEE Standard for Ferroresonant Voltage Regulators, Electronics Transformer Technical Committee of the IEEE Power Electronics Society, IEEE Std. 449-1990, May 16, 1990, 29 pages.
IMEON Energy, "IMEON 3.6 User Guide", no date, 20 pages.
IMEON Energy, "Self Consumption Smart Grid Inverter", 2016, 3 pages.
IMEON Energy, "Self Consumption Smart Grid Inverter", no date, 2 pages.
IMEON Energy, "The Self Consumption Smart Grid Inverter New Generation", no date, 8 pages.
International Search Report, PCT/US99/19677, dated Feb. 8, 2000, 5 pages.
International Searching Authority, "PCT/US2011/025000", International Search Report, dated Oct. 26, 2011, 9 pages.
International Searching Authority, "PCT/US2012/021619", International Search Report, dated May 17, 2012, 7 pages.
International Searching Authority, ISR & Written Opinion, PCT/US2018/050094, dated Dec. 27, 2018, 7 pages.
International Searching Authority, ISR & Written Opinion, PCT/US2018/050500, dated Feb. 28, 2019, 6 pages.
International Searching Authority, ISR, PCT/US2012/021622, dated May 17, 2012, 7 pages.
International Searching Authority, PCT Notification of Transmittal of the International Search Report and the Written Opinion of the International Searching Authority, or the Declaration, dated Dec. 8, 2016, 8 pages.
Ivensys, "Power When You Really Need It!" Publication No. CSG29FXA, Feb. 2000, 2 pages.
Ivensys, "Sometimes Less Is More!" Publication No. CSG28FXA, Feb. 2000, 2 pages.
Jain et al., High Frequency Triport UPS Topologies for Emerging Fiber Networks, Telecommunications Energy conference, IEEE, 1998, pp. 505-512.
Jefferson T. Mitchell et al., Rectifiers and Energy Conservation, Telecommunications, Mar. 1979, 3 pages.
Kakalec, "A Feedback-Controlled Ferroresonant Voltage Regulator," IEEE Transactions of Magnetics, Mar. 1970, 5 pages, vol. Mag-6, No. 1.
Lectro Products Incorporated, "Lectro Ferro Family," Publication No. CSG16FXA, Nov. 1998, 4 pages.
Lectro Products Incorporated, "Solving CATV Power Solutions," Publication No. CSG24FYA, Jun. 1999, 12 pages.
Marcotte et al, "Powering Cable TV Systems," Reprinted from Broadband Systems & Design, Jun. 1996, 4 pages.
Marcotte, "Power migration strategies for future-proofing," Reprinted from CED Magazine, Jun. 1997, 4 pages.
McGraw-Hill, Dictionary of Scientific and Technical Terms Fifth Edition, p. 745 and pp. 1696-1697, 1994.
Multipower, Inc., "Confluence Newsletters, vols. I and II," "MP 900," "MP1350," web site http://www.multipowerups.com/index.htm, Aug. 2000, 16 pages.
Nedap, "Data sheet fro 24 Vdc lead-acid batteries, PowerRouter Solar Battery the innovative all-in-one-unit", no date, 2 pages.
Nedap, "Installation Manual PowerRouter Solar Inverter", Jan. 9, 2013, 46 pages.
Nedap, "Installer Manual PowerRouter Solar Inverter", Jan. 9, 2013, 46 pages.
Nedap, "PowerRouter Connect, Technical data", no date, 1 page.

(56) References Cited

OTHER PUBLICATIONS

Nedap, "PowerRouter Solar, Technical data", no date, 1 page.
Phoenix Broadband Technologies, L.L.C., Installation & Operation Manual, 2005, 44 pages.
Rando, AC Triport—A New Uninterruptible AC Power Supply, Telephone Energy Conference, IEEE, 1978, pp. 50-58.
Rex Teets, Application and Design of Ferroresonant Transformers, No Date, pp. 28-34.
Robert J. Kakalec et al., New Technology for Battery-Charging Rectifiers, Bell Laboratories Record, May 1979, pp. 131-134.

* cited by examiner

FERRORESONANT TRANSFORMER SYSTEMS AND METHODS WITH SELECTABLE INPUT AND OUTPUT VOLTAGES FOR USE IN UNINTERRUPTIBLE POWER SUPPLIES

RELATED APPLICATIONS

This application, U.S. patent application Ser. No. 15/294,571, filed Oct. 14, 2016—claims priority of U.S. Provisional Application Ser. No. 62/242,862, filed on Oct. 16, 2015. The contents of the application listed above is incorporated herein by reference.

TECHNICAL FIELD

The present invention relates to ferroresonant transformers systems and, in particular, ferroresonant transformers systems for use in uninterruptible power supplies that are capable of accommodating different input and output voltages.

BACKGROUND

Uninterruptible power supplies are ideally capable of operating in operating environments having differing utility voltage standards. The need exists for improved uninterruptible power supplies, and ferroresonant transformer systems for use in such improved uninterruptible power supplies, capable of being easily and quickly field-modified to operate using different utility voltage standards.

SUMMARY

The present invention may be embodied as a ferroresonant transformer system comprising a core, a shunt, first and second input windings, an inverter winding, a tank winding, a resonant capacitor, an output capacitor, a plurality of switches, and at least two output terminals. The tank winding defines a plurality of switch tap locations and at least two output tap locations. The resonant capacitor is connected across at least a portion of the tank winding. Each switch is operatively connectable between one of the switch tap locations and the resonant capacitor. Each output terminal is operatively connected to one of the at least two output tap locations.

The present invention may also be embodied as a power supply adapted to be connected to a source of utility power and a load comprising a ferroresonant transformer system, a battery system, and an inverter. The ferroresonant transformer system comprises a core, a shunt, first and second input windings, an inverter winding, a tank winding, a resonant capacitor, an output capacitor, a plurality of switches, and a plurality of output terminals. The tank winding defines a plurality of switch tap locations and at least two output tap locations. The resonant capacitor is connected across at least a portion of the tank winding. The output capacitor is operatively connected to ground. Each switch is operatively connected between one of the switch tap locations and the resonant capacitor. Each output terminal is operatively connected to one of the at least two output tap locations. The inverter is operatively coupled between the battery system and the inverter winding. At least one of the first and second input windings is connected to the source of utility power. The at least two output terminals are operatively connected to the load.

The present invention may also be embodied as a method of providing power from a source of utility power to a load comprising the following steps. A ferroresonant transformer is provided. The ferroresonant transformer comprising a core, a shunt, first and second input windings, an inverter winding, and a tank winding defining a plurality of switch tap locations and at least two output tap locations. A resonant capacitor is operatively connected across at least a portion of the tank winding. An output capacitor is operatively connected to ground. Each of a plurality of switches is operatively connected between one of the switch tap locations and the resonant capacitor. Each of a plurality of output terminals is operatively connected to one of the at least two output tap locations. A battery system is operatively connected to an inverter. The inverter is operatively connected to the inverter winding. At least one of the first and second input windings is operatively connected to the source of utility power. At least two output terminals are operatively connected to the load. The plurality of switches are controlled to provide a desired output power signal to the load.

DETAILED DESCRIPTION

Figure 1:
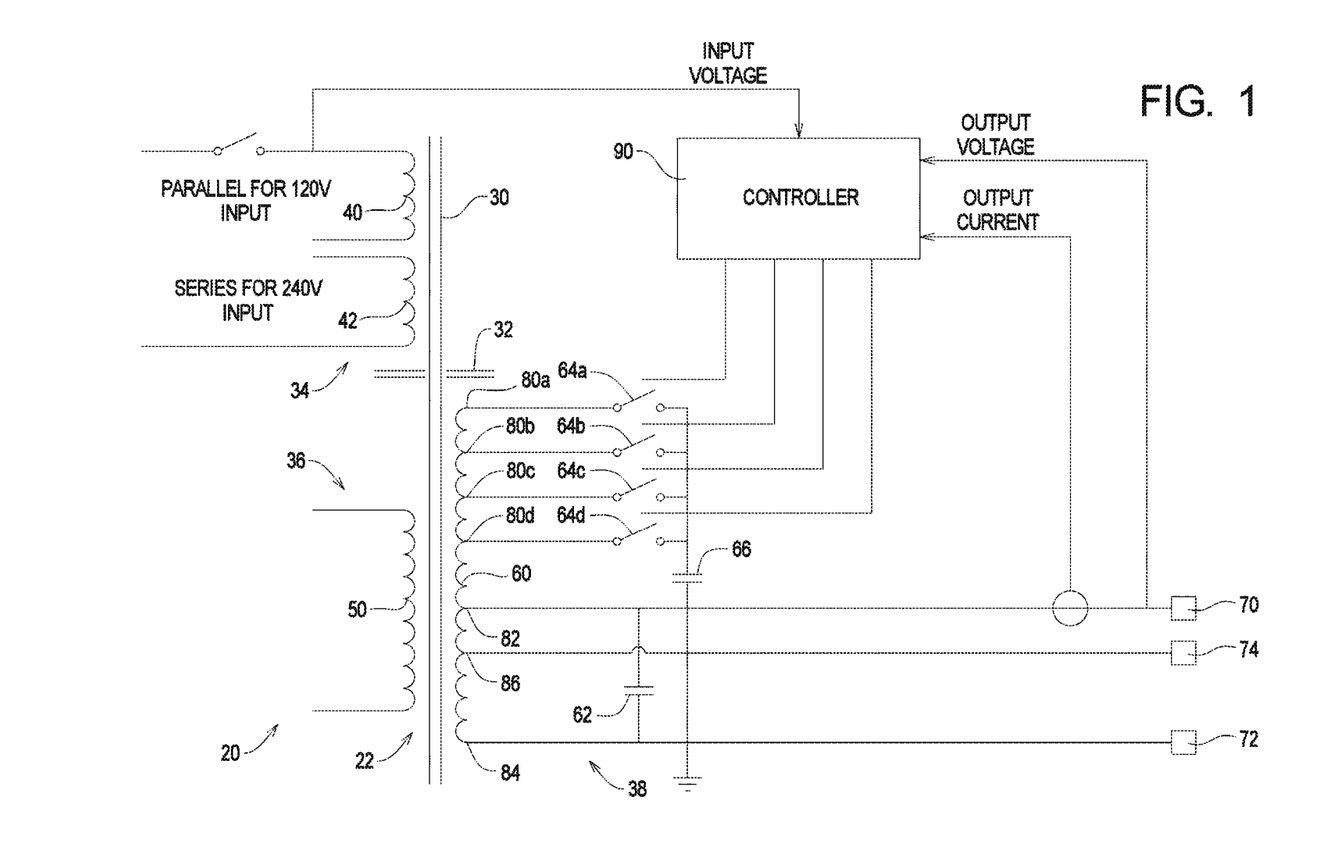
FIG. 1 depicts a first example ferroresonant transformer of the present invention adapted for use as part of an uninterruptible power supply.

Referring to FIG. 1 of the drawing, depicted therein is a first example ferroresonant transformer system 20 of the present invention. The first example ferroresonant transformer system 20 comprises a ferroresonant transformer 22 comprising a core 30 and a shunt 32. In the following discussion, certain reference characters will be used herein to refer to both a type of element and a specific one of that type of element. Letters will be appended to such reference characters when the reference character refers to a specific element.

In the first example ferroresonant transformer system 20, the shunt 32 is arranged relative to the core 30 to define a primary side comprising an input section 34 and a secondary side comprising an inverter section 36 and an output section 38 of the ferroresonant transformer 22. The input section 34 comprises first and second input windings 40 and 42. The inverter section comprises 36 comprises an inverter winding 50. The output section 38 comprises a tank winding 60, an output capacitor 62, a plurality of switches 64, a resonant capacitor 66, and output terminals 70 and 72. Optionally, an alternative output terminal 74 may be used.

The switches 64 are each operably connectable between one of a plurality of switch tap locations 80 of the tank winding 60 and the resonant capacitor 66. The output terminals 70 and 72 are connected to output tap locations 82 and 84 of the tank winding 60. Optionally, an alternative output tap 86 may be used.

The example output section 38 comprises four switches 64a, 64b, 64c, and 64d and four switch tap locations 80a, 80b, 80c, and 80d, although more or fewer switches 64 and switch tap locations 80 may be used. Typically, a plurality (two or more) of the switches 64 are used to implement tap switching. The example switches 64 can be triacs or mechanical relays.

A controller 90 is configured to control the switches 64. In general, the example controller 90 controls the switches 64 based on an output voltage, an output current, and an input voltage as will be described in further detail below.

Figure 2:
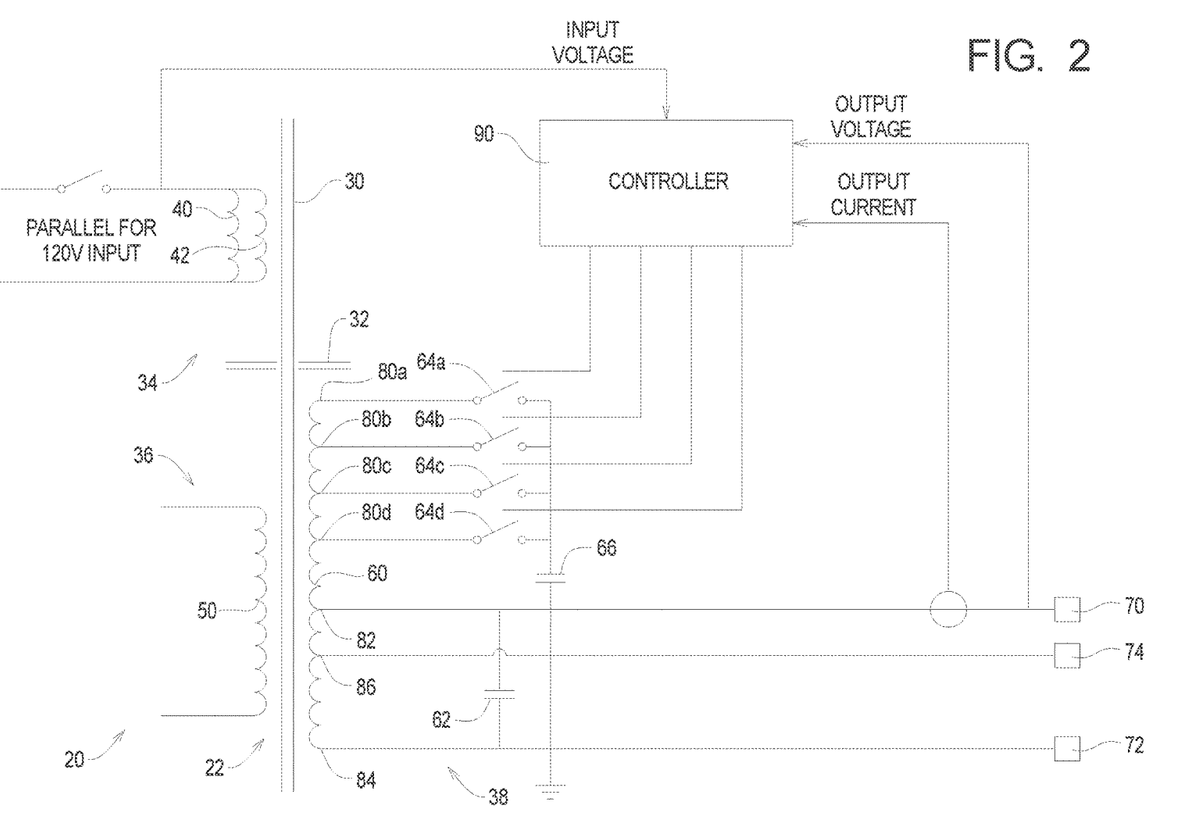
FIG. 2 depicts the first example ferroresonant transformer in a first configuration.
Figure 3:
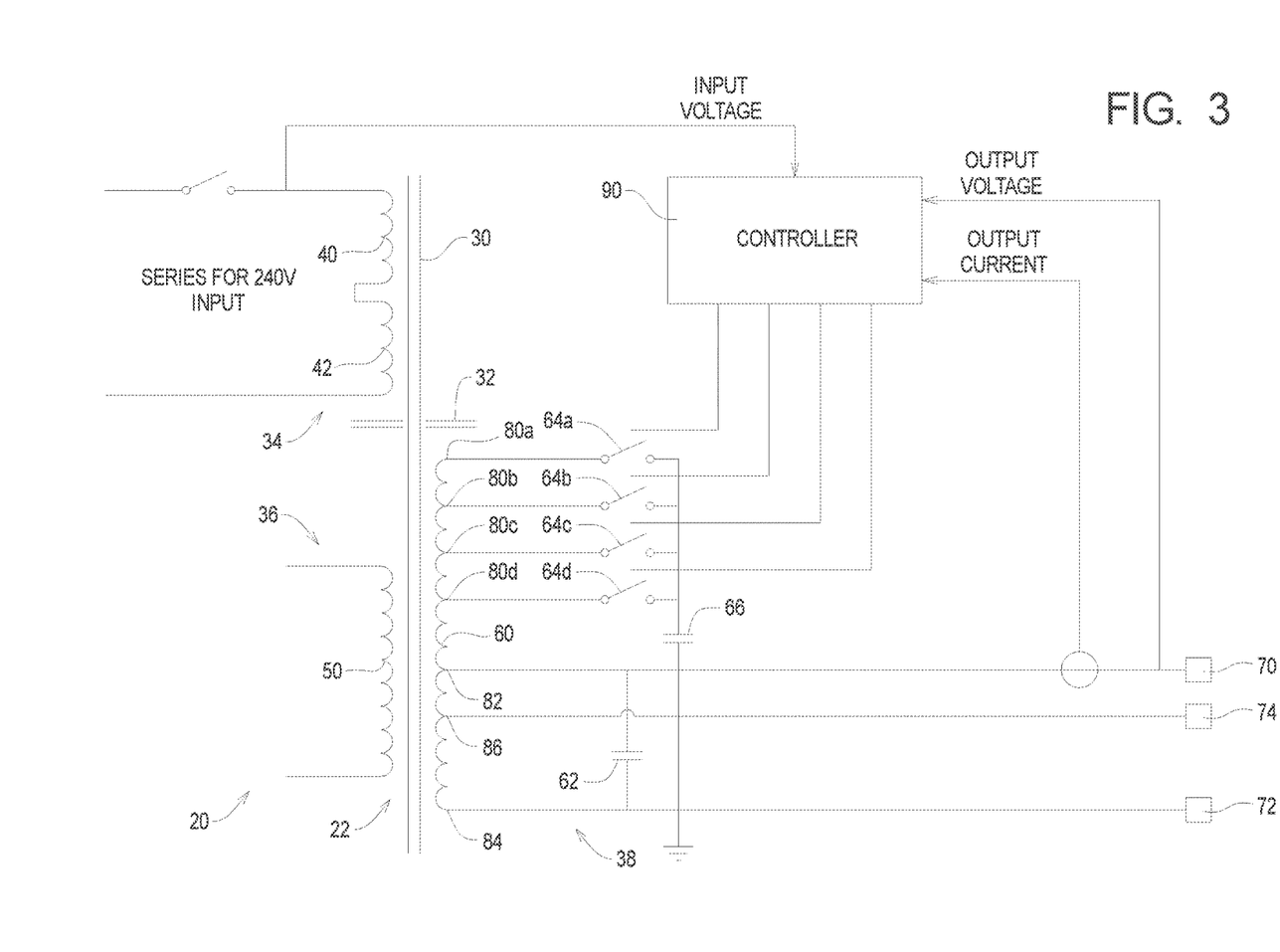
FIG. 3 depicts the first example ferroresonant transformer in a second configuration.

In the first example ferroresonant transformer system 20 the first and second input windings 40 and 42 are connected in parallel for 120V input voltage and in series for 240V input voltage. As shown in FIG. 2, the first and second input windings 40 and 42 are connected in parallel to accommodate a 120V input. FIG. 3 shows that first and second input windings 40 and 42 are connected in series to accommodate a 240V input. The switch between parallel and series connection can be implemented such that the selection between 120V and 240V can easily be made in the field.

In particular, the example controller 90 operates the switches 64a, 64b, 64c, and 64d based on based on the output voltage, the output current, and the input voltage to optimize the operation of the transformer system 20 for a given set of operating conditions. The use of the switches 64a, 64b, 64c, and 64d to control the one of the taps 80a, 80b, 80c, and 80d to which the resonant capacitor 66 is connected allows a size of the ferroresonant transformer 22 to be kept to a minimum. The example controller 90 is configured such that the switches 64a, 64b, 64c, and 64d are configured to open and close when the AC current signal is at or near a zero crossing point and such that only one of the switches 64a, 64b, 64c, and 64d is effectively closed at any given point in time.

The first example ferroresonant transformer system 20 of the present invention thus implements tap switching on the ferro tank winding 60 of the output section 38 thereof. The first example ferroresonant transformer 20 thus implements tap switching at the output section 38 (e.g., the tank winding 60) instead of the input section 34.

Figure 4:
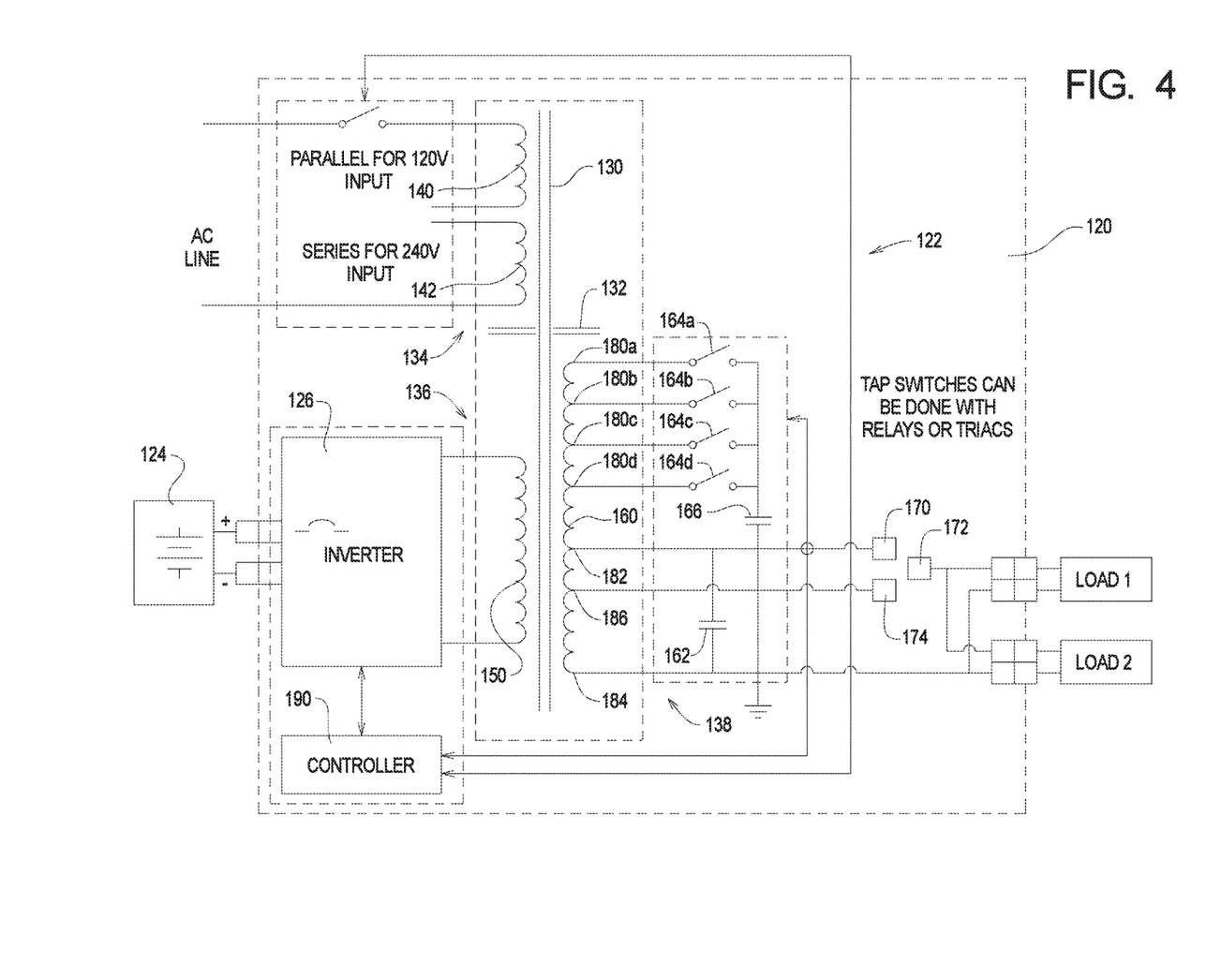
FIG. 4 is a block diagram of a first example uninterruptible power supply incorporating the first example ferroresonant transformer of FIG. 1.

FIG. 4 illustrates a first example uninterruptible power supply 120 incorporating a second example ferroresonant transformer system 122, a battery system 124, and an inverter 126.

The example ferroresonant transformer 122 forming part of the first example uninterruptible power supply 120 comprises a core 130 and a shunt 132. The example shunt 132 is arranged relative to the core 130 to define a primary side comprising an input section 134 and a secondary side comprising an inverter section 136 and an output section 138 of the ferroresonant transformer 122. The input section 134 comprises first and second input windings 140 and 142. The inverter section comprises 136 comprises an inverter winding 150. The output section 138 comprises a tank winding 160, an output capacitor 162, a plurality of switches 164, a resonant capacitor 166, and output terminals 170 and 172. Optionally, an alternative output terminal 174 may be used.

The switches 164 are each operably connectable between one of a plurality of switch tap locations 180 of the tank winding 160 and the resonant capacitor 166. The output terminals 170 and 172 are connected to output tap locations 182 and 184 of the tank winding 160. Optionally, an alternative output tap 186 may be used.

The example output section 138 comprises four switches 164a, 164b, 164c, and 164d and four switch tap locations 180a, 180b, 180c, and 180d, although more or fewer switches 164 and switch tap locations 180 may be used. Typically, a plurality (two or more) of the switches 164 are used to implement tap switching. The example switches 164 can be triacs or mechanical relays.

A controller 190 is configured to control the switches 164. In general, the example controller 190 controls the switches 164 based on an output voltage, an output current, and an input voltage as will be described in further detail below.

The first and second input windings 140 and 142 are connected in parallel for 120V input voltage (see, e.g., FIG. 2) and in series for 240V input voltage (see, e.g., FIG. 3). The switch between parallel and series connection can be implemented such that the selection between 120V and 240V can easily be made in the field.

In particular, the example controller 190 operates the switches 164a, 164b, 164c, and 164d based on based on the output voltage, the output current, and the input voltage to optimize the operation of the transformer system 122 for a given set of operating conditions. The use of the switches 164a, 164b, 164c, and 164d to control the one of the taps 180a, 180b, 180c, and 180d to which the resonant capacitor 166 is connected allows a size of the ferroresonant transformer 122 to be kept to a minimum. The example controller 190 is configured such that the switches 164a, 164b, 164c, and 164d are configured to open and close when the AC current signal is at or near a zero crossing point and such that only one of the switches 164a, 164b, 164c, and 164d is effectively closed at any given point in time.

The example uninterruptible power supply 120 normally operates in a line mode in which the example uninterruptible power supply 120 supplies power based on a line voltage present across one or both of the windings 140 and 142. The example inverter 126 is connected between the battery 124 and the inverter winding 150 to provide a source of DC power when the example uninterruptible power supply 120 is operating in a standby mode.

The first example uninterruptible power supply 120 incorporating a second example ferroresonant transformer system 122 thus implements tap switching on the ferro tank winding 160 of the output section 138 thereof. The second example ferroresonant transformer 122 thus implements tap switching at the output section 138 (e.g., the tank winding 160) instead of the input section 134.

By implementing tap switching at the output section (e.g., the tank winding 60 or 160 of output section 38 or 138) instead of the input section (e.g., 34 or 134), the first example ferroresonant transformer 20 and the first example uninterruptible power supply 120 comprising the second example ferroresonant transformer 122 provide the following benefits:
1. Simple dual input voltage windings configuration;
2. Ease of designing triac for tap switching devices with the high ferro inductance between input and output preventing huge utility current during tap switching;
3. High voltage tank winding allow the use of triac without losing efficiency due to high conduction loss between triac versus relay;
4. Cost reduction with low cost triac versus high cost relay; and
5. Improving the reliability with semiconductor triac versus mechanical relays.

The present invention may be implemented in forms other than those specifically described above, and the scope of the invention should be determined by the claims appended hereto and not the foregoing detailed descriptions of examples of the present invention.

What is claimed is:
1. A power supply adapted to be connected to a source of utility power and a load, comprising:
   a ferroresonant transformer system comprising
      a core;

a shunt;
first and second input windings;
an inverter winding;
a tank winding defining a plurality of switch tap locations and at least two output tap locations;
a resonant capacitor connected across at least a portion of the tank winding;
an output capacitor operatively connected to ground;
a plurality of switches, where each switch is operatively connected between one of the switch tap locations and the resonant capacitor; and
a plurality of output terminals, where each output terminal is operatively connected to one of the at least two output tap locations;
a battery system; and
an inverter operatively coupled between the battery system and the inverter winding; whereby
at least one of the first and second input windings is connected to the source of utility power;
at least two output terminals are operatively connected to the load; and
to regulate an output voltage of the ferroresonant transformer system, a selected switch of the plurality of switches is closed while any non-selected switch of the plurality of switches is open such that the output capacitor is operatively connected to a desired switch tap location of the plurality of switch tap locations.

2. A power supply as recited in claim 1, in which the first and second input windings are connected in series.

3. A power supply as recited in claim 1, in which the first and second input windings are connected in parallel.

4. A power supply as recited in claim 1, further comprising a controller for controlling the plurality of switches based on at least one of an output voltage, an output current, and an input voltage.

5. A power supply as recited in claim 1, further comprising a controller for controlling the plurality of switches based on an output voltage, an output current, and an input voltage.

6. A method of providing power from a source of utility power to a load, comprising the steps of:
providing a ferroresonant transformer comprising
a core;
a shunt;
a first and second input windings;
an inverter winding;
a tank winding defining a plurality of switch tap locations and at least two output tap locations;
operatively connecting a resonant capacitor across at least a portion of the tank winding;
operatively connecting an output capacitor to ground;
operatively connecting each of a plurality of switches between one of the switch tap locations and the resonant capacitor;
operatively connecting each of a plurality of output terminals to one of the at least two output tap locations;
operatively connecting a battery system to an inverter;
operatively connecting the inverter to the inverter winding;
operatively connecting at least one of the first and second input windings to the source of utility power;
operatively connecting at least two output terminals to the load; and
selecting one of the plurality of switches as a selected switch;
controlling the plurality of switches to provide a desired output power signal to the load by closing only the selected switch of the plurality of switches such that the output capacitor is operatively connected to a desired switch tap location of the plurality of switch tap locations.

7. A method as recited in claim 6, further comprising the step of connecting the first and second input windings in series.

8. A method as recited in claim 6, further comprising the step of connecting the first and second input windings in parallel.

9. A method as recited in claim 6, further comprising the step of controlling the plurality of switches based on at least one of an output voltage, an output current, and an input voltage.

10. A method as recited in claim 6, further comprising the step of controlling the plurality of switches based on an output voltage, an output current, and an input voltage.

* * * * *